A. F. SCHMIDT & W. T. JEFFERSON.
ADVERTISING AND DISPLAY APPARATUS.
APPLICATION FILED FEB. 8, 1910.
966,606.
Patented Aug. 9, 1910.
3 SHEETS—SHEET 1.
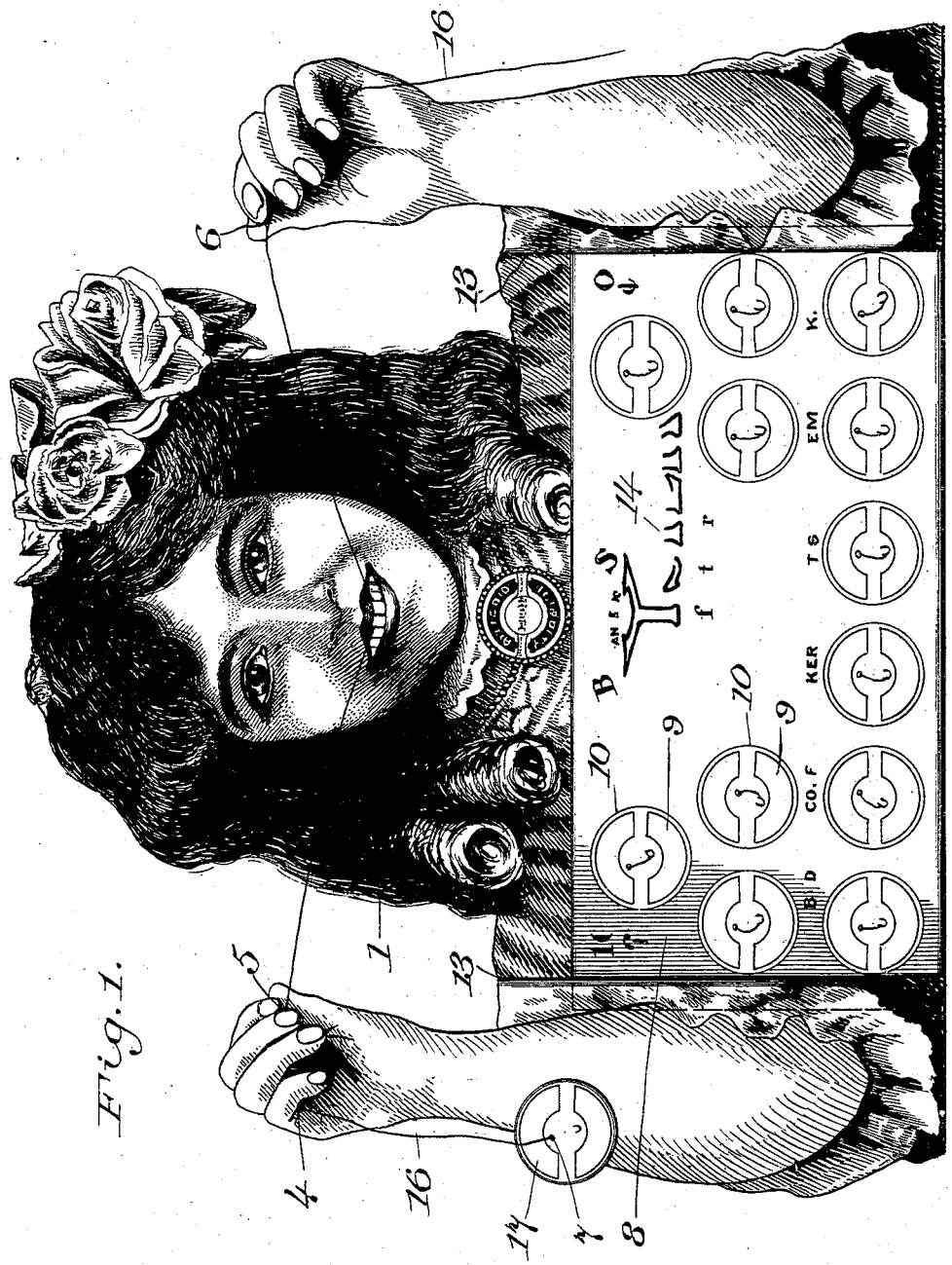

A. F. SCHMIDT & W. T. JEFFERSON.
ADVERTISING AND DISPLAY APPARATUS.
APPLICATION FILED FEB. 8, 1910.
966,606.
Patented Aug. 9, 1910.
3 SHEETS—SHEET 2.
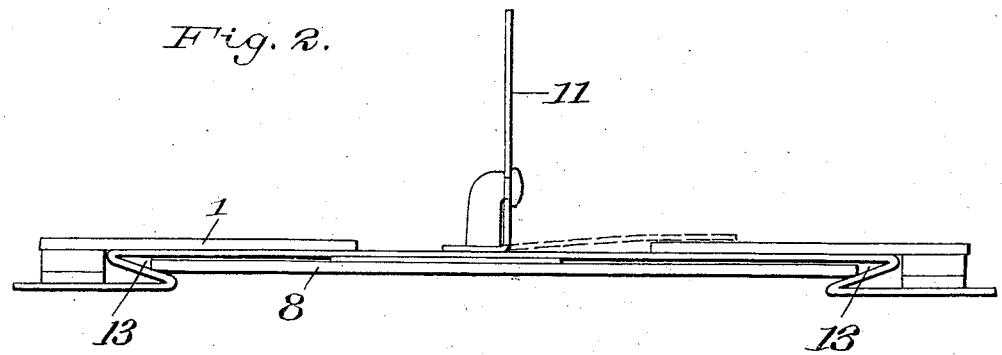
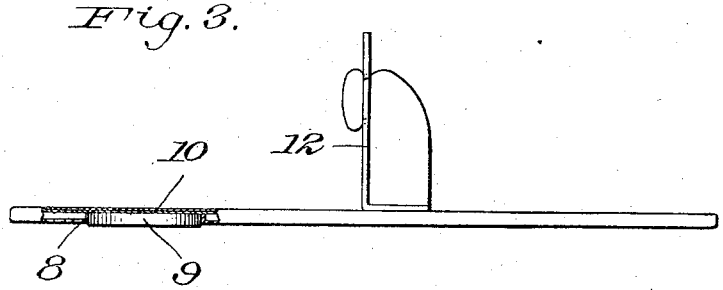
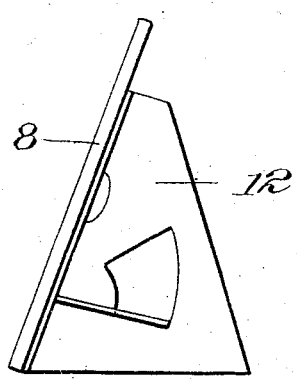

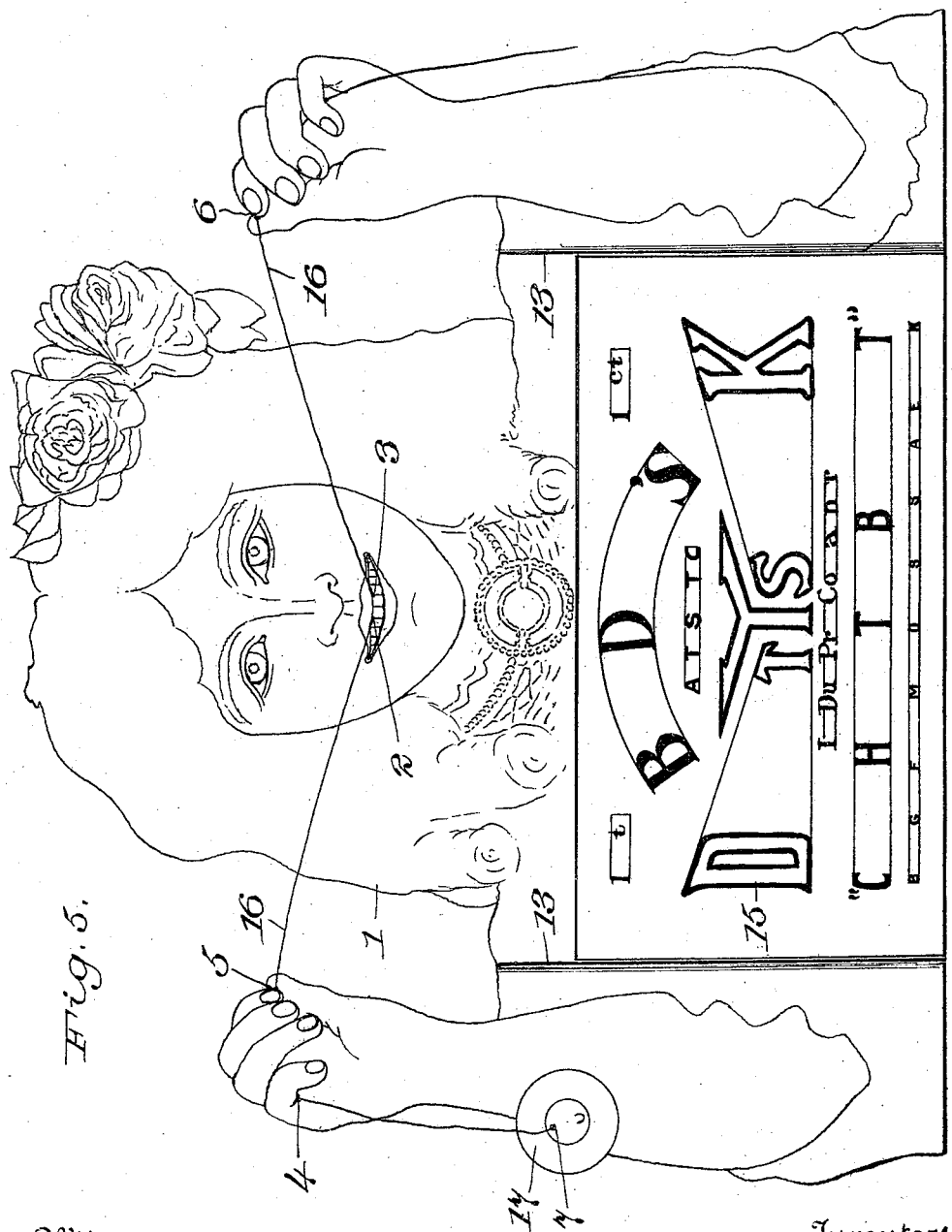

UNITED STATES PATENT OFFICE.

ALBERT F. SCHMIDT, OF ORANGE, NEW JERSEY, AND WILLIAM T. JEFFERSON, OF EVANSTON, ILLINOIS, ASSIGNORS TO BELDING BROS. & COMPANY, A CORPORATION OF CONNECTICUT.

ADVERTISING AND DISPLAY APPARATUS.

966,606.  Specification of Letters Patent.  Patented Aug. 9, 1910.

Application filed February 8, 1910. Serial No. 542,760.

*To all whom it may concern:*

Be it known that we, ALBERT F. SCHMIDT and WILLIAM T. JEFFERSON, citizens of the United States of America, residing at Orange, Essex county, State of New Jersey, and Evanston, Cook county, State of Illinois, respectively, have invented certain new and useful Improvements in Advertising and Display Apparatus, of which the following is a specification.

Our invention relates to apparatus for advertising and displaying goods in general, and more specifically consists of an improved apparatus for displaying and advertising small salable packages of thread such as dental silk or dental floss.

The best form of apparatus at present known to us embodying our invention is illustrated in the accompanying three sheets of drawings in which, Figure 1 is a front view of the apparatus. Fig. 2 is a plan view of the same. Fig. 3 is a detail plan view, partly broken away, of the panel containing the goods. Fig. 4 is an end view of the same, and Fig. 5 is an outline view of the main portion of the apparatus with the panel containing the goods removed.

Throughout the drawings like reference numbers refer to like parts.

1 represents a structure formed of paper, pasteboard, or the like, shaped and colored to represent, when viewed from the front, the upper portion of the figure of a girl holding up a hand on each side of her head. The lips are represented as parted, showing the teeth, and through the perforations 2 and 3 between certain of the teeth, and perforations 4, 5 and 6 between the fingers or thumb and fingers of the hands, passes a piece of the dental silk 16, which may also be represented as being drawn from a salable package of the same 17, through hole 7 in the covering of said package. Between the arms of the figure and across the breast is placed the panel 8, which is preferably made of pasteboard having depressions 10 of a size to receive and hold salable packages 9, 9, of the dental silk. This panel is detachably connected with the main structure 1, as by inserting it in grooves 13, 13, shown in Fig. 2. When the panel is removed there is exposed a space on the main structure, disclosing advertising matter 15 (see Fig. 5). The panel 8 also contains any desired advertising matter 14.

The main structure 1 is provided with any convenient form of easel back 11 (see Fig. 2) and the panel 8 has a similar folding easel back mechanism 12.

The method of operating our invention is as follows: The depressions 10 being filled with salable packages of the dental silk and the panel inserted in the grooves 13, the whole apparatus can be set up on the counter of a store by means of the easel back mechanism 11 and at once serves as an advertisement of the goods by reason of the advertising matter 14, and as a display device from which the packages of silk can be sold one by one. When the goods are all sold, a new lot can be forwarded in separate panels 8, which are conveniently transmitted through the mails, and can be promptly inserted in structure 1 in place of the empty panel which is taken out and thrown away. If the storekeeper objects to display devices of this kind, he can remove the panel 8 and use the structure 1 as an advertisement alone. If he objects to the large advertising structure 1, or if the same takes up too much room, he can open the easel back 12 on the panel 8 and use that alone as a display and advertising device of smaller size.

Having described our invention, what we claim is:

1. In a device for displaying thread, the combination of a structure shaped and colored to represent the upper portion of a human body with raised hands, having holes through which a piece of thread can be inserted, and a piece of thread inserted through said holes and stretching from one hand to the other.

2. In a device for displaying dental silk, the combination of a structure shaped and colored to represent the head, shoulders and arms of a human figure, the lips being parted to show the teeth, and the hands uplifted, the structure being provided with perforations between the teeth and between the fingers of each hand, and a piece of dental silk being strung through said perforations.

ALBERT F. SCHMIDT.
WILLIAM T. JEFFERSON.

Witnesses as to the signature of Albert F. Schmidt:
W. H. STILLHAMER,
JOSEPH S. KEARNEY.

Witnesses as to the signature of William T. Jefferson:
EDITH B. RANSOM,
J. E. FORD.